United States Patent [19]
Conary et al.

[11] Patent Number: 5,884,068
[45] Date of Patent: *Mar. 16, 1999

[54] INTEGRATED CIRCUIT HAVING A CORE WHICH OPERATES AT A SPEED GREATER THAN THE FREQUENCY OF THE BUS

[75] Inventors: James W. Conary, Aloha; Robert R. Beutler, Lake Oswego, both of Oreg.

[73] Assignee: Intel Corporation, Santa Clara, Calif.

[*] Notice: The term of this patent shall not extend beyond the expiration date of Pat. No. 5,537,581.

[21] Appl. No.: 838,393

[22] Filed: Apr. 9, 1997

Related U.S. Application Data

[63] Continuation of Ser. No. 37,711, Mar. 25, 1993, Pat. No. 5,634,117, which is a continuation of Ser. No. 778,575, Oct. 17, 1991, abandoned.

[51] Int. Cl.⁶ .................................................. G06F 13/00
[52] U.S. Cl. .................................................. 395/556
[58] Field of Search ............................................... 395/556

[56] References Cited

U.S. PATENT DOCUMENTS

| | | | |
|---|---|---|---|
| 3,623,017 | 11/1971 | Lowell et al. | 340/172.5 |
| 3,715,729 | 2/1973 | Mercy | 395/550 |
| 3,895,311 | 7/1975 | Basse et al. | 331/1 A |
| 3,919,695 | 11/1975 | Gooding | 340/172.5 |
| 3,931,585 | 1/1976 | Barker et al. | 331/1 A |
| 3,936,762 | 2/1976 | Cox, Jr. et al. | 329/104 |
| 4,077,016 | 2/1978 | Sanders et al. | 331/4 |
| 4,095,267 | 6/1978 | Morimoto | 364/200 |
| 4,203,153 | 5/1980 | Boyd | 364/200 |
| 4,264,863 | 4/1981 | Kojima | 328/39 |
| 4,293,927 | 10/1981 | Hoshii | 364/900 |
| 4,300,019 | 11/1981 | Toyomaki | 171/16 E |
| 4,365,290 | 12/1982 | Nelms et al. | 364/200 |
| 4,405,895 | 9/1983 | Flemming | 328/72 |
| 4,479,191 | 10/1984 | Nojima et al. | 364/707 |
| 4,615,005 | 9/1986 | Maejima et al. | 364/200 |
| 4,639,864 | 1/1987 | Katzman et al. | 364/200 |
| 4,667,289 | 5/1987 | Yoshida et al. | 364/200 |
| 4,669,099 | 5/1987 | Zinn | 377/47 |
| 4,698,748 | 10/1987 | Juzswik et al. | 364/200 |
| 4,758,945 | 7/1988 | Remedi | 364/200 |
| 4,766,567 | 8/1988 | Kato | 364/900 |
| 4,780,843 | 10/1988 | Tietjen | 364/900 |
| 4,814,591 | 3/1989 | Nara et al. | 235/800 |

(List continued on next page.)

FOREIGN PATENT DOCUMENTS

| | | |
|---|---|---|
| 0167853 | 1/1986 | European Pat. Off. . |
| 0366326 | 5/1990 | European Pat. Off. . |
| 0368144 | 5/1990 | European Pat. Off. . |
| 0385567 | 5/1990 | European Pat. Off. . |
| 0419908 | 9/1990 | European Pat. Off. . |
| 0451661 | 3/1991 | European Pat. Off. . |
| 0478132 | 4/1992 | European Pat. Off. . |
| 2010551 | 6/1979 | United Kingdom . |
| 2130765 | 6/1984 | United Kingdom . |

OTHER PUBLICATIONS

Case, "R4000 Extends R3000 Architecture with 64–bit Capabilities", Microprocessor Report vol. 5, Issue 19, pp. 10–14, Oct. 16, 1991.

Wilson, "MIPS Rethinks TISC with Superpiplining", Computer Design, vol. 30, Issue 3, pp. 28–31, Feb. 1, 1991.

Slater, "MIPS Previews 64–bit R4000 Architecture", Microprocessor Report, vol. 5, Issue 2, pp. 1–6, Feb. 6, 1991.

Intel Corporation, "Automotive Components Handbook", pp. 10.24–10.26, 1988.

*Primary Examiner*—Lance Leonard Barry, Esq.
*Attorney, Agent, or Firm*—Blakely, Sokoloff, Taylor & Zafman LLP

[57] ABSTRACT

A microprocessor that operates at the speed of the the bus or at a speed which is a multiple of the bus speed-on a selectable basis. The microprocessor includes a phase locked loop to generate clock signals for operations within the microprocessor and bus clock signals for data transfer operations on the bus. The present invention allows a microprocessor core to operate at the same frequency or twice the frequency of the address/data buses.

15 Claims, 4 Drawing Sheets

U.S. PATENT DOCUMENTS

| | | | |
|---|---|---|---|
| 4,823,292 | 4/1989 | Hillion | 364/707 |
| 4,841,440 | 6/1989 | Yonezu et al. | 364/200 |
| 4,881,205 | 11/1989 | Aihara | 365/222 |
| 4,896,260 | 1/1990 | Hyatt | 364/200 |
| 4,907,183 | 3/1990 | Tanaka | 364/707 |
| 4,922,450 | 5/1990 | Rose et al. | 364/900 |
| 4,935,863 | 6/1990 | Calvas et al. | 364/138 |
| 4,979,097 | 12/1990 | Triolo et al. | 364/200 |
| 4,980,836 | 12/1990 | Carter et al. | 364/483 |
| 4,991,129 | 2/1991 | Swartz | 364/707 |
| 5,021,679 | 6/1991 | Fairbanks et al. | 307/66 |
| 5,025,387 | 6/1991 | Frane et al. | 364/493 |
| 5,059,924 | 10/1991 | JenningsCheck | 331/1 A |
| 5,077,686 | 12/1991 | Rubinstein | 395/550 |
| 5,083,266 | 1/1992 | Watanbe | 395/275 |
| 5,103,114 | 4/1992 | Fitch | 307/271 |
| 5,123,107 | 6/1992 | Mensch, Jr. | 395/800 |
| 5,129,091 | 7/1992 | Yorimoto et al. | 395/750 |
| 5,133,064 | 7/1992 | Hotta et al. | 395/550 |
| 5,151,992 | 9/1992 | Nagae | 395/750 |
| 5,167,024 | 11/1992 | Smith et al. | 395/375 |
| 5,175,845 | 12/1992 | Little | 395/550 |
| 5,210,858 | 5/1993 | Jensen et al. | 395/556 |
| 5,220,672 | 6/1993 | Nakao et al. | 395/750 |
| 5,239,652 | 8/1993 | Seibert et al. | 395/750 |
| 5,249,298 | 9/1993 | Bolan et al. | 395/750 |
| 5,251,320 | 10/1993 | Kuzawinski et al. | 395/750 |
| 5,305,452 | 4/1994 | Khan et al. | 395/556 |
| 5,319,771 | 6/1994 | Takeda | 395/550 |
| 5,336,939 | 8/1994 | Eitrheim et al. | 307/269 |
| 5,537,581 | 7/1996 | Conary et al. | 395/556 |
| 5,634,117 | 5/1997 | Conary et al. | 395/556 |

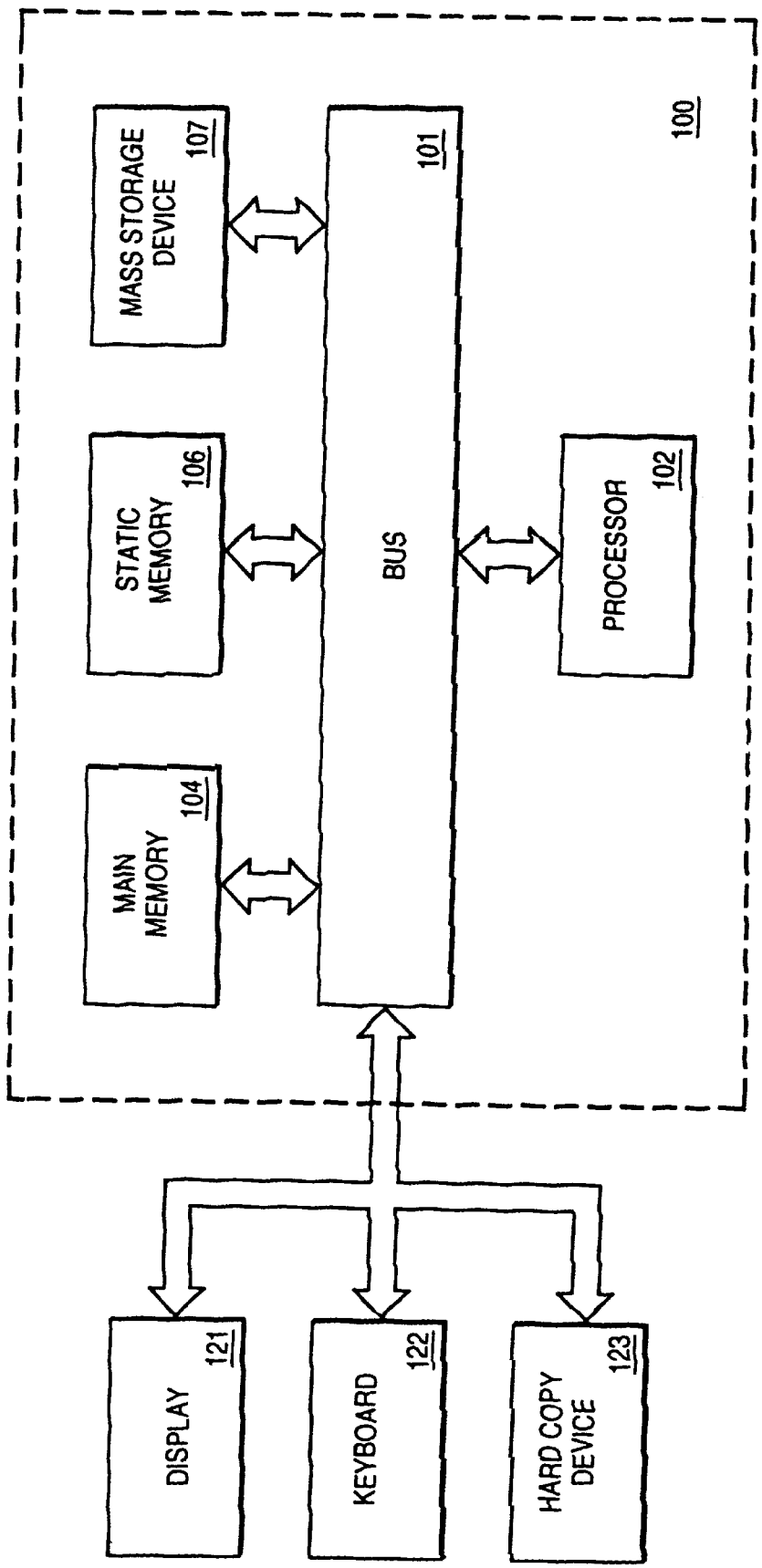
FIG—1 (PRIOR ART)

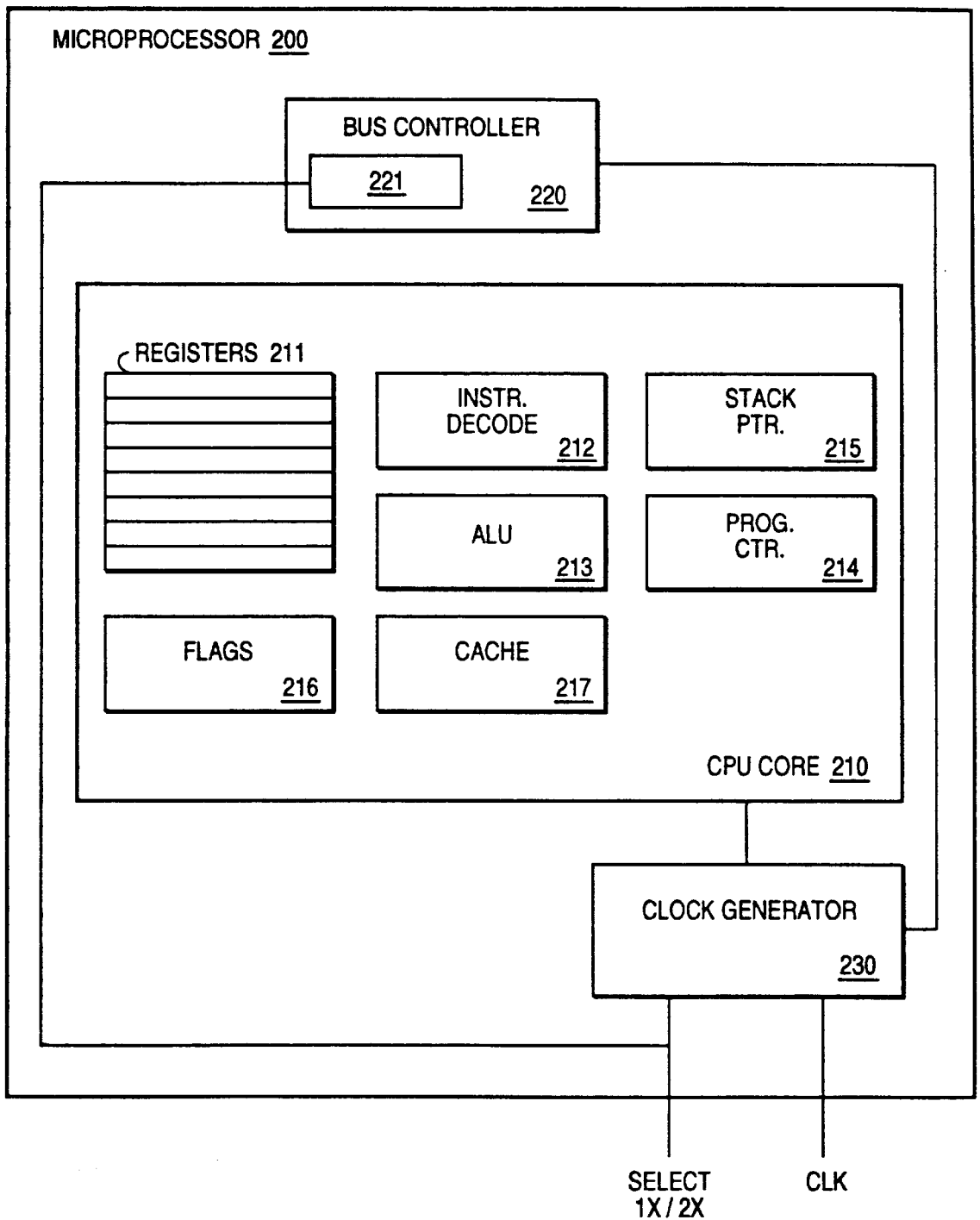
FIG_2

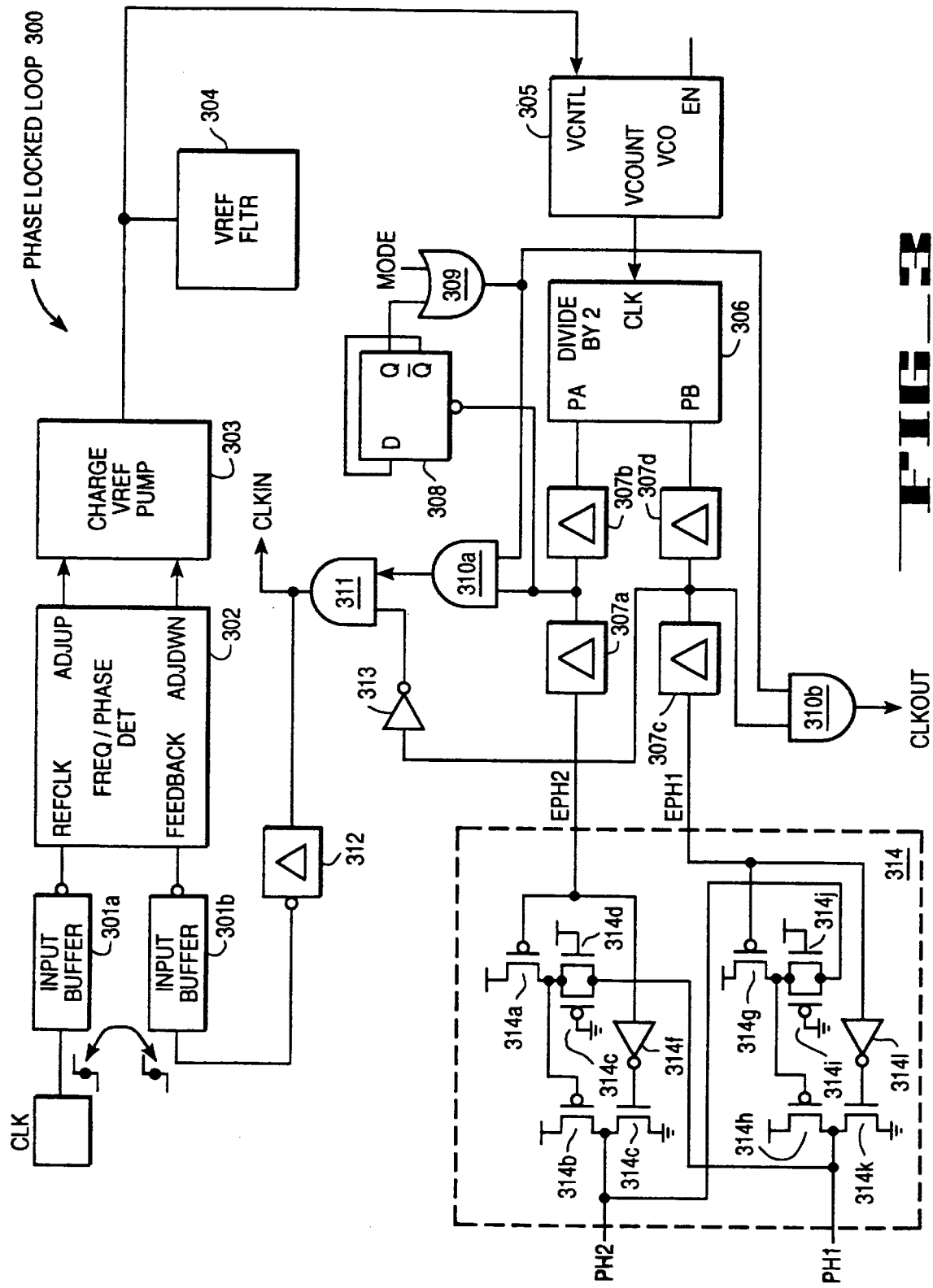
FIG_3

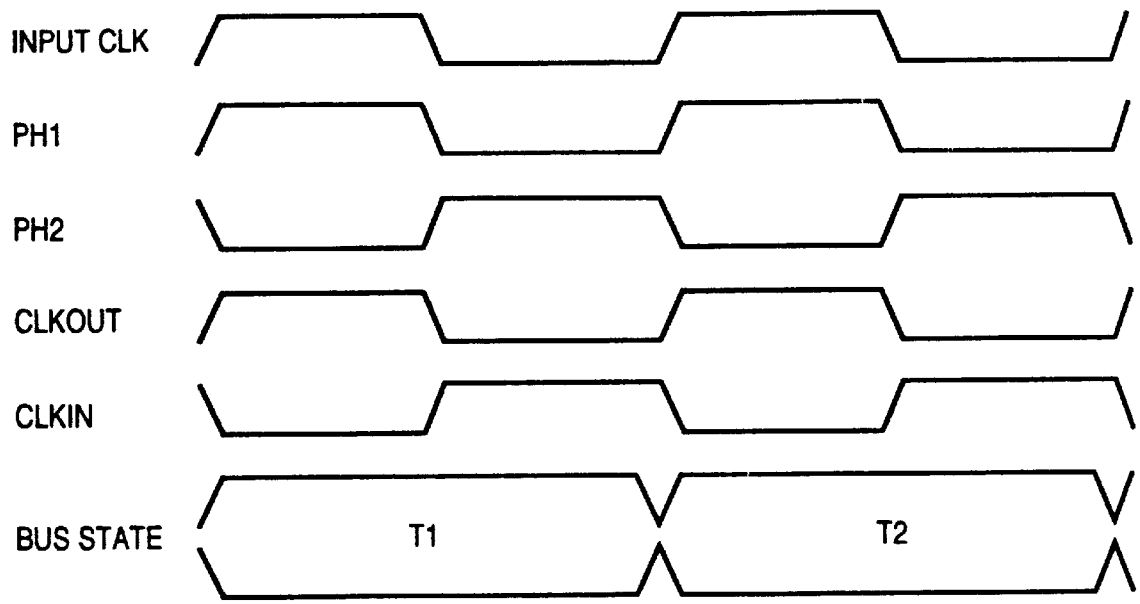
FIG_4
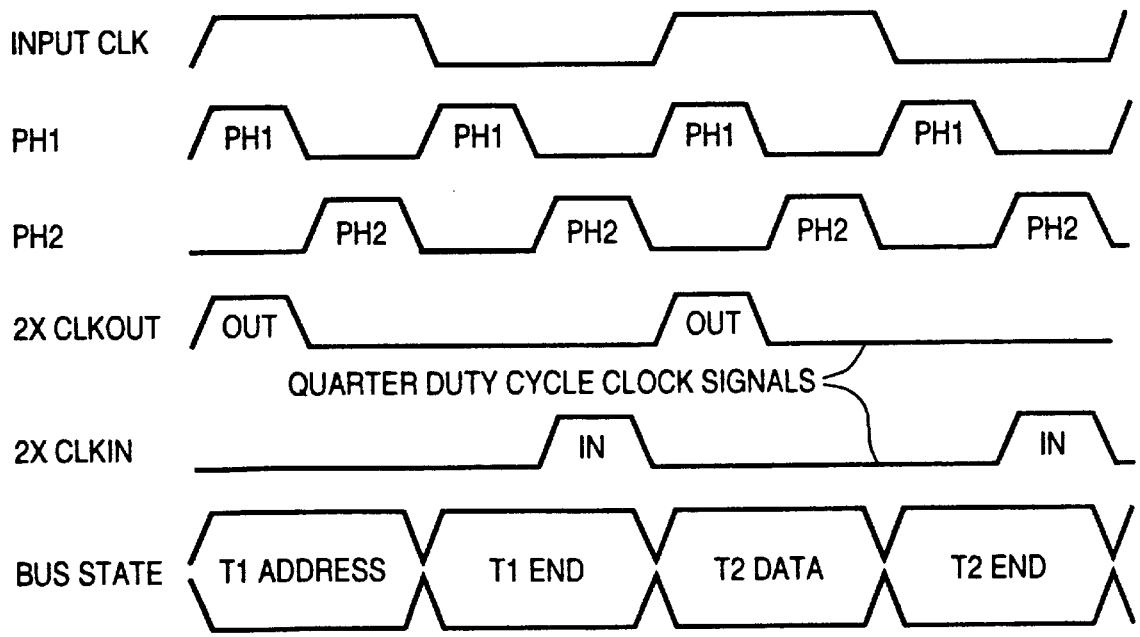
FIG_5

INTEGRATED CIRCUIT HAVING A CORE WHICH OPERATES AT A SPEED GREATER THAN THE FREQUENCY OF THE BUS

This is a continuation of application Ser. No. 08/037,711, filed Mar. 25, 1993 now U.S. Pat. No. 5,634,177 which is a continuation of application Ser. No. 07/778,575, filed Oct. 17, 1991 now abandoned.

FIELD OF THE INVENTION

This invention relates to the field of microprocessor speed within a digital computer and, more particularly, for allowing a microprocessor core to operate at a multiple of the frequency of the input clock to the address/data buses on a selectable basis.

BACKGROUND OF THE INVENTION

Typically, a computer system contains a microprocessor, a bus, and other peripheral devices. The microprocessor executes logical operations on the data in the computer system. The bus is utilized by the microprocessor and peripheral devices to transfer data, address and control signals. The peripheral devices are either storage devices, input/output (I/O) devices, etc. Generally, everything in the computer system operates at the same frequency (i.e. cycle type).

The microprocessor has a core unit for processing the data. The core consists of the central processing unit (CPU), the cache memory, etc. The microprocessor communicates with the bus using a bus controller. Since all operations of the computer system occur at the same frequency, the logic operations performed by the core are at the same frequency as the transfer of data, address and control signals on the computer system bus. The bus controller ensures this timing by generating the control signals for the bus.

Some logic operations performed by the core unit, such as arithmetic operations, require multiple cycles to complete. During completion of these multiple cycle operations, the bus remains idle. The present invention allows the core unit to operate at a faster speed than the bus. By doing this, the bus is used to transfer data more frequently. Therefore, bus idle states are minimized and operations can be performed more quickly.

When changing the microprocessor to operate at a faster rate, it is advantageous to modify it in such a way as to minimize changes to the rest of the computer system. In this way, the new microprocessor need only be inserted into the computer system without changing any of the other system hardware (i.e., without totally redesigning the board). It is also advantageous to keep hardware changes to a minimum so that preexisting computer applications can benefit by upgrading their computer systems without having to acquire new system components, thereby avoiding huge expenditures.

To facilitate these requirements, the present invention provides a microprocessor which can be operated at both the bus speed and at a speed faster than the bus speed. The present invention allows the timing specifications of the bus to remain the same in either mode. In this way, changes to the entire computer system are minimized.

The advantage of the present invention over the prior art is that it permits a microprocessor design to be modified to allow the core to operate at a multiple of the bus frequency with only a very small number of design changes. This drastically reduces design time. Moreover, using this technique, the majority of the bus control logic (approximately 99%) can be designed assuming operation at the bus speed only. This approach also allows the addition of select logic to permit a single bond pad to select between the fast and slow modes of operation. This single die design can therefore be used to fulfill the requirements of a number of microprocessor types through the use of wire bond programming of the select logic pad.

SUMMARY OF THE INVENTION

A microprocessor that operates at the speed of the the bus or at a speed which is faster than that of the bus on a selectable basis is described. The microprocessor includes a clock generator which generates both the core clock signals for clocking the operation of the microprocessor core and the bus clock signals for clocking transfers of data on the computer bus. A switch is coupled to the clock generator for switching-the microprocessor from the normal mode to the fast mode and vice versa. In normal mode, the microprocessor operates at the same frequency as the bus. In the fast mode, the microprocessor operates at a speed which is a multiple of the bus frequency. In the currently preferred embodiment, the microprocessor operates at twice the frequency in the fast mode.

The microprocessor also includes a core unit which carries out the operations and manipulations of the data for the computer system and a bus controller which drives data on the bus in response to the bus clock signals.

In the currently preferred embodiment, the clock generator is a 4x phase locked loop. This phase locked loop uses a pulse swallow circuit to mask every other clock signal during the fast mode. This causes the bus clock signals to be generated at half the frequency of the core clock signals. In the currently preferred embodiment, the pulse swallowing circuit is an AND gate used in conjunction with a divide-by-2 circuit.

The present invention also includes a holdoff signal generator for generating a holdoff signal in the bus controller. The holdoff signal prevents the bus controller from performing its regular cycle transition, which occurs during normal mode, when a signal has been masked in the fast mode.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 1 is an illustration of the computer system architecture.

FIG. 2 is a block diagram of the microprocessor of the currently preferred embodiment of the present invention.

FIG. 3 is a circuit schematic of the clock generator of the currently preferred embodiment of the present invention.

FIGS. 4 and 5 illustrate the timing signals generated by the clock generator of the currently preferred embodiment of the present invention.

DETAILED DESCRIPTION OF THE INVENTION

A microprocessor which selectively operates at the same frequency or a faster frequency as the address/data bus is described. In the following description, numerous specific details are set forth such as specific numbers of signals and gates, etc., in order to provide a thorough understanding of the present invention. It will be obvious, however, to one skilled in the art that the present invention may be practiced without these specific details. In other instances, well-known computer operations and components have not been described in detail to avoid unnecessarily obscuring the present invention.

Overview of the Computer System of the Present Invention

Referring first to FIG. 1, an overview of a computer system of the present invention is shown in block diagram form. It will be understood that while FIG. 1 is useful for providing an overall description of the computer system of the present invention, a number of details of the system are not shown. As necessary for disclosure of the present invention, further detail is set forth with reference to the other figures provided with this specification. Further, the present invention is described with reference to its preferred embodiment; alternative embodiments which may be conceived by one of ordinary skill in the art are considered within the scope of the claims set forth below.

As illustrated in FIG. 1, a computer system, as may be utilized by the preferred embodiment of the present invention, generally comprises a bus or other communications means 101 for communicating information, a processing means 102 coupled with bus 101 for processing information, a random access memory (RAM) or other dynamic storage device 104 (commonly referred to as a main memory) coupled with bus 101 for storing information and instructions for said processing means 102, a read only memory (ROM) or other static storage device 106 coupled with bus 101 for storing static information and instructions for said processing means 102, a data storage device 107, such as a magnetic disk and disk drive, coupled with said bus 101 for storing information and instructions, a display device 121, such as a cathode ray tube, liquid crystal display, etc., coupled to bus 101 for displaying information to the computer user, an alphanumeric input device 122 including alphanumeric and other keys, etc., coupled to bus 101 for communicating information and command selections to said processor 102 and for controlling cursor movement. Finally, the system includes a hard copy device 123, such as a plotter or printer "POSTSCRIPT", for providing a visual representation of the computer images. Hard copy device 123 is coupled with the processor 102, main memory 104, static memory 106 and mass storage device 107 through bus 101.

Of course, certain implementations and uses of the present invention may not require nor include all of the above components. For example, in certain implementations a keyboard and cursor control device for inputting information to the system may not be required. In other implementations, it may not be required to provide a display device for displaying information.

Overview of the Microprocessor of the Present Invention

FIG. 2 shows a block diagram of the microprocessor, processor 200, utilized by the preferred embodiment of the present invention. Processor 200 is preferably manufactured as an integrated circuit using a metal-oxide-semiconductor (MOS) process. Processor 200 generally comprises core unit 210 for processing data, bus controller 220 for controlling communication of processor 200 with the bus of the computer system (FIG. 1), and clock generator 230 for providing the fundamental timing and the internal operating frequency for processor 200.

In the currently preferred embodiment, core unit 210 operates at one or two times the speed of the bus in the computer system on a selectable basis. Core unit 210 comprises registers 211 for holding and storing data values, instruction decoder 212 for interpreting the successive instructions (fetched from memory) to determine the operation core unit 210 is to perform, and arithmetic logic unit (ALU) 213 for performing the instructed operations, such as add, complement, compare, shift, move, etc., on quantities contained in registers 211. Furthermore, core unit 210 comprises program counter 214 for tracking the current location in the executing program. Normally, program counter 214 increments after each instruction. However, it can attain a new value after a "jump" or "branch" instruction. Stack pointer 215 and flags 216 (carry, zero, sign) contain status information which is tested for conditional branching. Cache memory 217 holds values recently fetched from memory for quicker access. The specifics of the operation of these items is well-known in the art.

Clock generator 230 generates the clock signals for the operation of processor 200 and the bus of the computer system. Separate clock signal generators for both the core clock signals and the bus clock signals could be utilized. In the currently preferred embodiment of the present invention, clock generator 230 produces core clock signals at one times (1×) or two times (2×) the frequency of the bus on a selectable basis. However, the teachings of the present invention could be utilized to produce core clock signals at other multiples of the bus clock signals.

The core clock signals clock the operations performed by core unit 210 and bus controller 220. In the currently preferred embodiment, the core clock signals generated are phase one, PH1, and phase two, PH2. The bus clock signals time the transfer of data occurring on the computer system bus. Data transfers occur in two clock phases. During an out phase, data is driven out onto the bus, while during an in phase, data is driven into processor 200 from the bus. In the currently preferred embodiment, the bus clock signals generated by clock generator 230 corresponding to the out and in phases are the CLKOUT and CLKIN signals respectively.

In the currently preferred embodiment, the 2× core clock signals are at a frequency of 66 MHz and the 1× core clock signals are at a frequency of 33 MHz. These core clock signals control the operation of core unit 210 (FIG. 2) and bus controller 220 (FIG. 2). Thus, during the 2× mode of the currently preferred embodiment, core unit 210 and bus controller 220 operate at 66 MHz. Only a small portion of bus controller 220 knows the bus is operating at 33 MHz.

During 1× mode, bus clock signal, CLKOUT and CLKIN, are the same as the core clock signals, PH1 and PH2 (with the exception of a small delay). In the currently preferred embodiment, all of the signals are 33 MHz. During the 2× mode, bus clock signals, CLKOUT and CLKIN, are ¼ duty cycle 33 MHz clock signals that are synchronized with every other core clock signal PH1 and PH2 respectively. Since these synchronized bus clock signals going into bus controller 220, which determines the overall operating speed of the bus, are half the frequency of the core clock signals, the bus operates at half the frequency.

In the currently preferred embodiment of the present invention, clock generator 230 receives an input clock signal, CLK, and a select signal, SELECT. The CLK signal is an external clock signal in the computer system.

All external timing parameters are specified with respect to the rising edge of CLK. In the currently preferred embodiment, CLK is a 33 MHz signal. SELECT signal indicates the frequency that the core clock signals are to be generated by clock generator 230. In the currently preferred embodiment, SELECT indicates that the core clock signals generated by clock generation means are either one or two times the frequency of the bus clock signals. The SELECT signal is derived from a bond option in the currently preferred embodiment. This selectability allows a single die to fulfill the requirements of a number of microprocessor types using wire bond programming of the select logic bond pad.

Bus controller 220 controls the transfer of data between processor 200 and the computer system bus (FIG. 1). Since the original phase high time of the 2× mode core phases, PH1 and PH2, are utilized by the 1× mode bus clock signals, CLKOUT and CLKIN, and the phases of the bus clock signals are aligned with the beginning and ending of the 2× core clock signals, circuitry to drive the half speed bus is minimized.

When operating core unit 210 is operating at twice the speed of the bus, bus controller 220 attempts to transition from the old cycle start to the old cycle end. To prevent this, bus controller 220 generates a holdoff signal. The holdoff signal redefines the bus states of the bus controller. The bus clock signals are offset from the beginning of the 1× cycle start and the end of the 1× cycle end using a wait state. This allows the timing to be the same. Therefore, additional output drivers and input latches are not required by the present invention to interface processor 200 with the computer system bus in 2× mode.

The holdoff signal is generated by holdoff generator 221. Holdoff generator 221 generates the holdoff signal by adding two phases of delay to the CLKOUT signal. This prevents the bus controller 220 from transitioning prematurely. The Holdoff generator is activated using the SELECT signal. An AND gate receives the SELECT signal and outputs a logical zero when processor 200 is in 1× mode. This logical zero output disables holdoff generator 221.

Overview of the Clock Generator of the Present Invention

In the currently preferred embodiment of the present invention, the clock generator is a phase locked loop (PLL) 300, as shown in FIG. 3. PLL 300 generates both the core clock signals, PH1 and PH2, and the bus clock signals, CLKOUT and CLKIN. In the currently preferred embodiment, PLL 300 is a 4× phase locked loop which generates the core clock signals at one time or two times the frequency of the bus clock signals.

Referring to FIG. 3, PLL 300 comprises input buffers 301a and b, frequency phase detector 302, charge pump 303, loop filter 304, voltage-controlled oscillator (VCO) 305, a divide-by-2 circuit 306, delays 307a–d and 312, D flip-flop 308, OR gate 309, AND gates 310a and b and 311, invertor 313, and PH2/PH1 circuitry 314.

Input buffers 301a and b buffer the signals on their inputs and output the signals in inverted form. The purpose of the buffers is to align the positive edges of their input signals so that frequency phase detector 302 can determine the phase difference between the two signals. Phase detector 302 only examines the buffered negative edges of the signals. The input of input buffer 301a is coupled to the input clock, CLK. In the currently preferred embodiment, CLK is a 33 MHz input to the processor from an external clock source. The output of buffer 301 a is coupled to the RefCLK input of frequency phase detector 302. The input to input buffer 301b is coupled to delay 312. The input represents the feedback signal for PLL 300. The output of buffer 301b is coupled to the Feedback input of frequency phase detector 302.

Phase detector 302 compares the input frequencies from input buffers 301a and b and generates an output that is a the measure of the phase difference between the signals. Phase detector 302 has two outputs. The ADJUP output is coupled to one of the inputs of charge pump 303. The ADJDWN output is coupled to the other input of charge pump 303. The ADJUP and ADJDWN outputs are generated when the edges of the feedback signal lags or leads the edges of the CLK signal respectively.

Charge pump 303 is coupled to loop filter 304 and the VCNTL input of VCO 305. Charge pump 303 generates a charging or discharging current and supplies it to the capacitive elements of loop filter 304 in response to the ADJUP or ADJDWN pulses from phase detector 302 respectively. This current charges or discharges the capacitive elements in loop filter 304, generating a control voltage. The control voltage indicates the extent of difference between the input frequency of CLK signal and the feedback signal. The control voltage is coupled to the VCNTL input of VCO 305.

VCO 305 receives the control voltage and an enable signal EN and produces VCOUNT. The VCOUNT output of VCO 305 is coupled to the CLK input of divide-by-2 306. VCO 305 is enabled when the computer system is powered up. When enabled, VCO 305 generates a frequency VCOUNT in response to the control voltage. If the frequency of the CLK signal does not equal the frequency of the feedback signal, the frequency generated by VCO 305 deviates in the direction of the frequency of the CLK signal.

Divide-by-2 306 produces two outputs, PA and PB. These outputs are half the frequency of the output VCOUNT of VCO 305 and are non-overlapping pulses. The outputs PA and PB are coupled to delays 307b and d respectively. In the currently preferred embodiment, delays 307b and d comprise invertors. The output of delay 307b is coupled to delay 307a, one of the inputs to AND gate 310a, and the clock input to D flip-flop 308. The output of delay 307d is coupled to the input of delay 307c and one of the inputs of AND gate 310b and the input of invertor 313. Delays 307a and c comprise invertors in the currently preferred embodiment. The output of delay 307a is coupled to the EPH2 input of PH1/PH2 circuitry 314. The output of delay 307c is coupled to the EPH1 input of PH1/PH2 circuitry 314.

D flip-flop 308 generates output Q in response to being clocked by the PA output signal of divide-by-2 306 buffered through delay 307b. The $\overline{Q}$ output is coupled to input D of D flip-flop 308. The output of D flip-flop 308 is coupled to one of the inputs to OR gate 309. The other input to OR gate 309 is coupled to the MODE signal. In the currently preferred embodiment, the MODE signal indicates whether clock generator 300 is to produce core clock signals which are one time (1×) or two times (2×) the frequency of the bus clock signals. The output of OR gate 309 is coupled to the other inputs of AND gate 310a and 310b. The output of AND gate 310b is the CLKOUT signal. The output of AND gate 310a is coupled to one of the inputs of AND gate 311. The other input of AND gate 311 is coupled to the output of invertor 313. The output of AND gate 311 is the CLKIN signal. The output of AND gate 311 is also coupled to the input of delay 312. In the currently preferred embodiment, delay 312 comprises an series of invertors. The output of delay 312 is inverted and coupled to the input of buffer 301b.

PH1/PH2 circuitry 314 receives the EPH2 and EPH1 as inputs and produces the core clock phase 2 signal, PH2, and the core clock phase 1 signal, PH1. Referring to FIG. 3, the EPH2 input is coupled to the input of invertor 314f and the gate of pnp transistor 314a. The source of transistor 314a is coupled to Vcc. The drain of transistor 314a is coupled to the gate of pnp transistor 314b, the drain of tranisistor 314d and the source of transistor 314c. The gate of transistor 314d is coupled to Vcc, and the source is coupled to the PH1 output. The gate of transistor 314c is coupled to ground and its drain is coupled to the PH1 output. The source of transistor 314b is coupled to Vcc and its drain is coupled to the PH2 output and the drain of npn transistor 314e. The gate of transistor 314e is coupled to the output of inverter 314f. The source of transistor 314e is coupled to ground. The EPH1 input is coupled to the input of inverter 314l and the gate of pnp transistor 314g. The source of transistor 314g is coupled to Vcc. The drain of transistor 314g is coupled to the gate of pnp transistor 314h, the drain of tranisistor 314j and the source of transistor 314i.

The gate of transistor 314j is coupled to Vcc, and the source is coupled to the PH2 output. The gate of transistor 314i is coupled to ground and its drain is coupled to the PH2 output. The source of transistor 314h is coupled to Vcc and its drain is coupled to the PH1 output and the drain of npn transistor 314k. The gate of transistor 314k is coupled to the output of inverter 314l. The source of transistor 314k is coupled to ground. The purpose of circuitry 314 is to ensure that the PH2 and PH1 signals do not overlap. Functionally, circuitry 314 allows one signal to go low before the other goes high. The operation of this implementation is well-known in the art.

Operation of the Present Invention

In the currently preferred embodiment, PLL 300 produces core clock signals, PH2 and PH1, and bus clock signals, CLKIN and CLKOUT, signals in response to an input CLK signal. The CLK signal comes into clock generator 230 of processor 200 (FIG. 2). The signal is buffered by input buffer 301a and enters phase detector 302 with the buffer feedback signal (also buffered). Phase detector 302 outputs either an adjust up, ADJUP, or an adjust down, ADJDWN, signal. Charge pump 303 receives the signals and generates a charging or discharging current and supplies it to the capacitive elements of loop filter 304. This current charges or discharges the capacitive elements in loop filter 304, generating a control voltage. The control voltage produced is coupled to the VCNTL input to VCO 305.

The control voltage drives the output of VCO 305. As the control voltage increases, the frequency output by VCO 305 gets higher. As the control voltage decreases, the frequency output by VCO 305 gets lower. The output of VCO 305 is input into divide-by-2 306. Divide-by-2 306 divides the output frequency of VCO 305 to produce two outputs, PA and PB, wherein every rising edge of the CLK signal produces an edge, both rising and falling, for the output signal. These outputs are half the frequency of the output VCOUNT of VCO 305 and are non-overlapping pulses.

The PA and PB signals are the drivers for the core clock phase 2, PH2, and phase 1, PH1 signals respectively. The PA signal is delayed by delays 307b and 307a and is then input into the EPH2 input to circuitry 314. The PB output signal is delayed by delay 307d and then is input into circuitry 314 at input EPH1. The outputs of circuitry 314 are the core clock signals, PH2 and PH1.

The PA output, essentially the PH2 signal as output from delay 307b, produces the feedback signal for PLL 300 through AND gates 310a and 311 and delay 312. The feedback signal is the CLKIN signal produced by PLL 300. AND gate 310a acts to either "swallow" the feedback signal or allow it to pass through depending on its input from OR gate 309. During 2× mode, AND gate 310a (and AND gate 310b) mask every other clock signal. Therefore, the feedback signal being input into AND gate 311 is one-half the frequency of the feedback signal, i.e., the PH2 core clock signal, during 2× mode. Invertor 313 is the other input to AND gate 311 and allows the feedback signal to pass through AND gate 311 when the PH1 signal, which is from the PB output of divide-by-2 306 buffered by delay 307d, is low., This ensures proper timing between the core clock signals and the bus clock signals.

The output of AND gate 311 is the CLKIN signal. In 1× mode, since the feedback signal is allowed to pass through AND gate 310a, the CLKIN signal is the same frequency as the PH2 core clock signal. In 2× mode, since every other pulse of the feedback signal is masked, the CLKIN signal is one-half the frequency of the PH2 core clock signal. This is also the same relationship between the CLKOUT signal and the PH1 core clock signal, as output by AND gate 310b.

The CLKIN signal, i.e. the feedback signal, is delayed by delay 312 and fed back through PLL 300 by input buffer 301b. In 2× mode, since the feedback frequency is one-half the input CLK signal, charge pump 303 and loop filter 304 produce more voltage to compensate for the large difference between the frequencies of the CLK and CLKIN signals. The large control voltage produced causes VCO 305 to generate a higher frequency. A higher frequency from 305 produces PH1 and PH2 core clock signals that are higher. In this manner, the core clock signals, PH1 and PH2, are generated by the present invention at 2 times (2×) the frequency of the CLK signal.

The operation of AND gate 310a is controlled by the output of OR gate 309. An active high on the MODE signal switches PLL 300 into 1× mode and active low switches PLL 300 into the 2× mode. Therefore, when PLL is in 1× mode, the output of OR gate 309 is always a logical 1. Thus, the feedback signal is passed through AND gate 310a without being masked. Moreover, the PH1 signal is passed through AND gate 310b as the CLKOUT signal. In this situation, the CLKOUT and CLKIN signals are the same frequency as the PH1 and PH2 core clock signals. Thus, the bus (FIG. 1) operates at the same frequency as core unit 210 (FIG. 2).

When PLL is switched into 2× mode, the output of OR gate 309 is determined by the output of D flip-flop 308. When the output of D flip-flop 308 is a logical 1, a logical 1 appears at AND gate 310a and allows the feedback signal to pass through. When the output of D flip-flop 308 is a logical 0, a logical 0 appears at AND gate 310a, and AND gate 310a masks the feedback signal, thereby preventing it from passing through the gate. Furthermore, when the output of D flip-flop 308 is a logical 0, AND gate 310b masks the output of the CLKOUT signal.

D flip-flop 308 is added as a second divide-by-2. D flip-flop 308 is added off phase so that it is not in the critical path. The output of delay 307b clocks D flip-flop 308. Therefore, every other clock pulse of the output of delay 307b produces a logical 1 output from D flip-flop 308. Thus, when PLL 300 is in 2× mode, every other clock pulse of the output of delay 307b produces a logical 1 output from OR gate 309, preventing AND gate 310a from allowing the feedback signal to pass through AND gate 310a. Furthermore, in this situation, AND gate 310b prevents the PH1 signal from passing through it as the CLKOUT signal. Therefore, both the CLKOUT and CLKIN signals are at half the frequency of the PH1 and PH2 core clock signals because half of the signal pulses were masked. However, even though they are half the frequency, the timing of the signals is exactly the same because the rising and falling edges of the bus clock signals, CLKIN and CLKOUT, are aligned with resigning and falling edges of the core clock signals, PH2 and PH1, respectively. This allows core unit 210 (FIG. 2) to operate at twice the speed of the bus without changing the timing.

The timing signals generated by PLL 300 of the currently preferred embodiment during 1× mode are shown in FIG. 4.

Referring to FIG. 4, the input clock signal CLK is shown. The CLK signal is a 33 MHz 1× input from the external world. PH1 and PH2 are 33 MHz core clock phase 1 and phase 2 clock signals respectively output from PH2/PH1 circuitry 314. The CLKOUT and CLKIN signals are also 33 MHz bus clock signals that are synchronized with every other PH1 and PH2 core clock signal respectively.

FIG. 4 also shows the BUS STATE for the computer system of the present invention during 1× mode. The bus cycle starts at T1 when the addresses are driven out onto the computer system bus when the CLKOUT signals transition high. Bus controller 220 then uses logic to set up a transition from T1 to T2 during the PH2 core clock signals of T1. At the start of T2, data is driven onto the computer system bus when the CLKOUT signal transitions high if the cycle is a write cycle; otherwise, nothing occurs during the CLKOUT high state. During T2, data is returned from the computer system bus during the CLKIN phase. The data is used if a ready signal indicates that the data is good. At this state, bus controller 220 can transition to either new T2, a new T1 or an idle state depending on the cycle type.

The timing signals generated, by PLL 300 of the currently preferred embodiment during 2× mode are shown in FIG. 5. Referring to FIG. 5, the input clock signal CLK is shown. The CLK signal is a 33 MHz 1× input from the external world. PH1 and PH2 are 66 MHz core clock phase 1 and phase 2 clock signals respectively output from PH2/PH1 circuitry 314. The CLKOUT and CLKIN signals are quarter duty cycle 33 MHz bus clock signals that are synchronized with every other PH1 and PH2 core clock signal respectively.

FIG. 5 also shows the BUS STATE for the computer system of the present invention. The bus cycle starts at T1 ADDRESS when the addresses are driven out onto the computer system bus when the CLKOUT signals transition high. It should be noted that T1 is split into two states, T1 ADDRESS and T1 END. This effectively adds a wait cycle to T1 since during the T1 ADDRESS state, the state machine of bus controller 220 does not know that it is in T1. At T1 END, bus controller 220 determines that it is in T1. Bus controller 220 then uses logic to set up a transition from T1 to T2 during the PH2 core clock signals of T1 END. At the start of T2, data is driven onto the computer system bus when the CLKOUT signal transitions high if the cycle is a write cycle; otherwise, nothing occurs during the CLKOUT high state. During T2 END, data is returned from the computer system bus during the CLKIN phase. The data is used if a ready signal indicates that the data is good. At this state, bus controller 220 can transition to either new T2, a new T1 or an idle state depending on the cycle type.

Whereas many alterations and modifications of the present invention will no doubt become apparent to a person of ordinary skill in the art after having read the foregoing description, it is to be understood that the particular embodiment shown and described by way of illustration are in no way intended to be considered limiting. Therefore, reference to the details of the preferred embodiments are not intended to limit the scope of the claims which themselves recite only those features regarded as essential to the invention.

A microprocessor which selectively operates at the same frequency or a multiple of the frequency of the computer system bus has been described.

We claim:

1. An integrated circuit for use in a computer system having a bus operating according to at least one bus clock signal at a first frequency, said integrated circuit comprising:
   a clock generator to generate at least one core clock signal at a second frequency that is faster than the first frequency and having clock pulse widths equal in length to that of clock pulses of said at least one bus clock signal;
   a core coupled to the clock generator to perform operations in response to said at least one core clock signal; and
   a bus controller coupled to the clock generator, the core and the bus to transfer data between the core and the bus in accordance with said at least one bus clock signal while the core and the bus controller operate at the clock speed of said at least one core clock signal.

2. The integrated circuit defined by claim 1 wherein the second frequency is an integer multiple of the first frequency.

3. The integrated circuit defined by claim 2 wherein the integer multiple is two, such that the second frequency of said at least one core clock signal is twice the first frequency.

4. The integrated circuit defined by claim 1 wherein the second frequency is twice the first frequency.

5. The integrated circuit defined by claim 1 wherein the clock generator comprises a phase locked loop.

6. An integrated circuit for use in a computer system having a bus operating according to at least one bus clock signal at a first frequency, said integrated circuit comprising:
   a clock generator to generate at least one core clock signal at a second frequency that is faster than the first frequency and having clock pulse widths equal in length to that of clock pulses of said at least one bus clock signal;
   a core coupled to the clock generator to perform operations in response to said at least one core clock signal; and
   a bus controller coupled to the clock generator, the core and the bus to transfer data between the core and the bus in accordance with said at least one bus clock signal while the core and the bus controller operate at the clock speed of said at least one core clock signal;
   wherein the clock generator comprises a phase locked loop comprising
      a phase detector to receive an external clock signal and a feedback signal and to generate a first signal in response thereto that is a measure of a phase difference between the external clock signal and the feedback signal;
      a voltage generator to generate a voltage control signal in accordance with the first signal;
      a voltage-controlled oscillator to generate said at least one core clock signal in response to the voltage control signal; and
      a frequency divider to generate the feedback signal in response to said at least one core clock signal, said feedback signal having a frequency which is a multiple of said at least one core clock signal, such that the oscillator produces a signal which is N times the frequency of the external clock signal.

7. The integrated circuit defined by claim 6 wherein the frequency divider comprises:
   first logic to generate a masking signal in response to one of said at least one core clock signal, said masking signal being at a first state or a second state; and
   a second logic to generate the feedback signal in response to said one core clock signal and the masking signal when the masking signal is in the first state and masks the feedback signal the masking signal is in the second state.

8. A processor for use in a computer system having a bus operating according to at least one bus clock signal at a first frequency, said processor comprising:

a clock generator to generate at least of core clock signal at a second frequency that is faster than the first frequency;

a CPU core coupled to the clock generator to execute instructions in response to said at least one core clock signal; and a bus controller coupled to the clock generator, the CPU core and the bus to transfer data between the CPU core and the bus in response to said at least one bus clock signal while the CPU core and the bus controller operate at the clock speed of said at least one core clock signal.

9. The processor defined by claim 8 wherein the second frequency is an integer multiple of the first frequency.

10. The processor defined by claim 9 wherein the integer multiple is two, such that the second frequency of said at least one core clock signal is twice the first frequency.

11. The processor defined by claim 8 wherein the second frequency is twice the first frequency.

12. The processor defined by claim 8 wherein the clock generator comprises a phase locked loop.

13. A processor for use in a computer system having a bus operating according to at least one bus clock signal at a first frequency, said processor comprising:

a clock generator to generate at least of core clock signal at a second frequency that is faster than the first frequency;

a CPU core coupled to the clock generator to execute instructions in response to said at least one core clock signal; and a bus controller coupled to the clock generator, the CPU core and the bus to transfer data between the CPU core and the bus in response to said at least one bus clock signal while the CPU core and the bus controller operate at the clock speed of said at least one core clock signal;

wherein the clock generator comprises a phase locked loop comprising a phase detector to receive an external clock signal and a feedback signal and to generate a first signal in response thereto that is a measure of on phase difference between the external clock signal and the feedback signal;

a voltage generator to generate a voltage control signal in accordance with the first signal;

a voltage-controlled oscillator to generate said at least one core clock signal in response to the voltage control signal; and a frequency divider to generate the feedback signal in response to said at least one core clock signal, said feedback signal having a frequency which is a multiple of said at least one core clock signal, such that the oscillator produces a signal which is N times the frequency of the external clock signal.

14. The processor defined by claim 13 wherein the frequency divider comprises:

a first logic to generate a masking signal in response to one of said at least one core clock signal, said masking signal being at a first state or a second state; and a second logic to generate the feedback signal in response to said one core clock signal and the masking signal when the masking signal is in the first state and masks the feedback signal the masking signal is in the second state.

15. An integrated circuit for use in a computer system having a bus operating according to at least one bus clock signal at a first frequency, said integrated circuit comprising:

a core to perform operations in response to said at least one core clock signal having a frequency greater than the first frequency; and a bus controller coupled to the core and the bus to transfer data between the core and the bus in accordance with said at least one bus clock signal while the core and the bus controller operate at the clock speed of said at least one core clock signal.

* * * * *